Patented May 28, 1929.

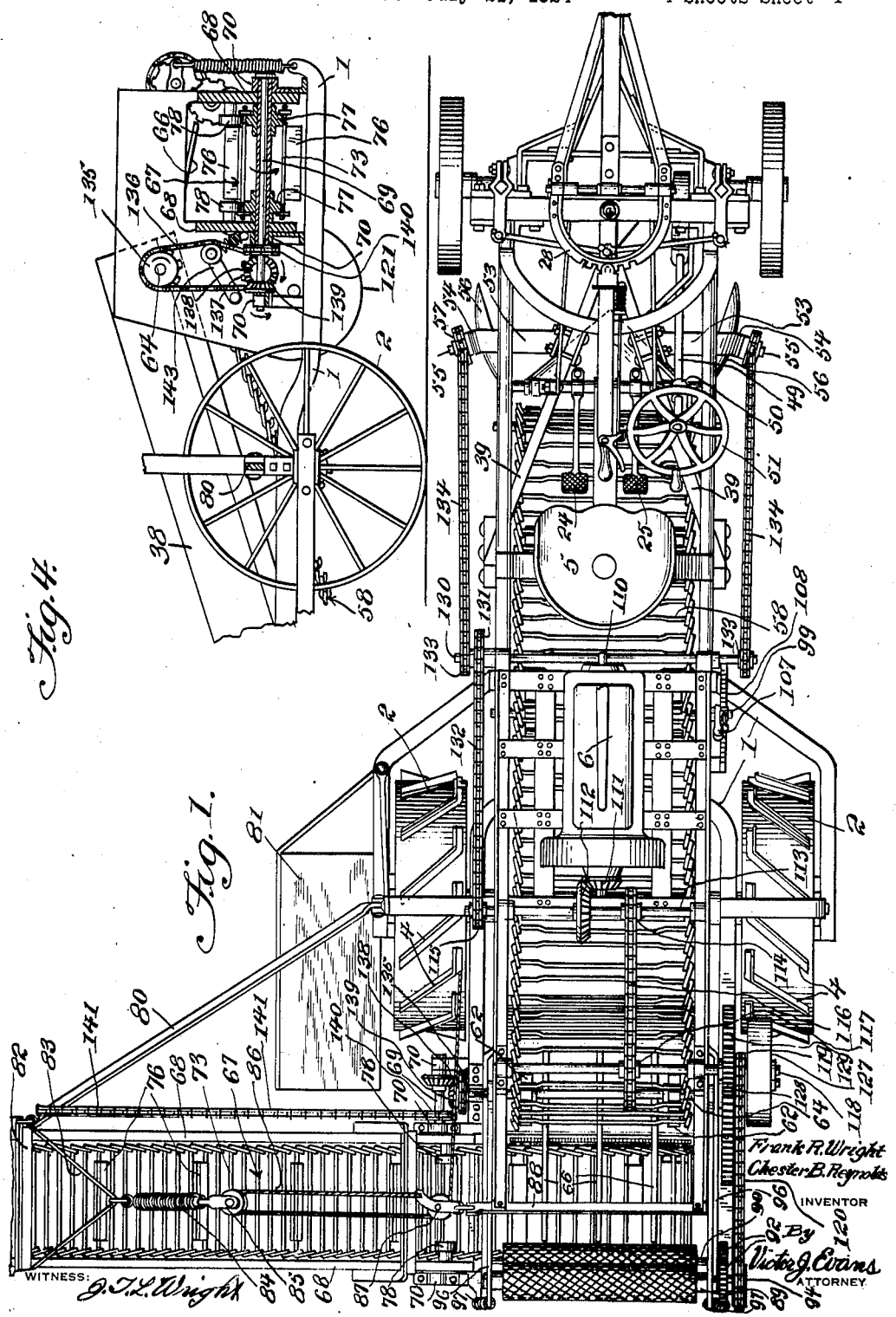

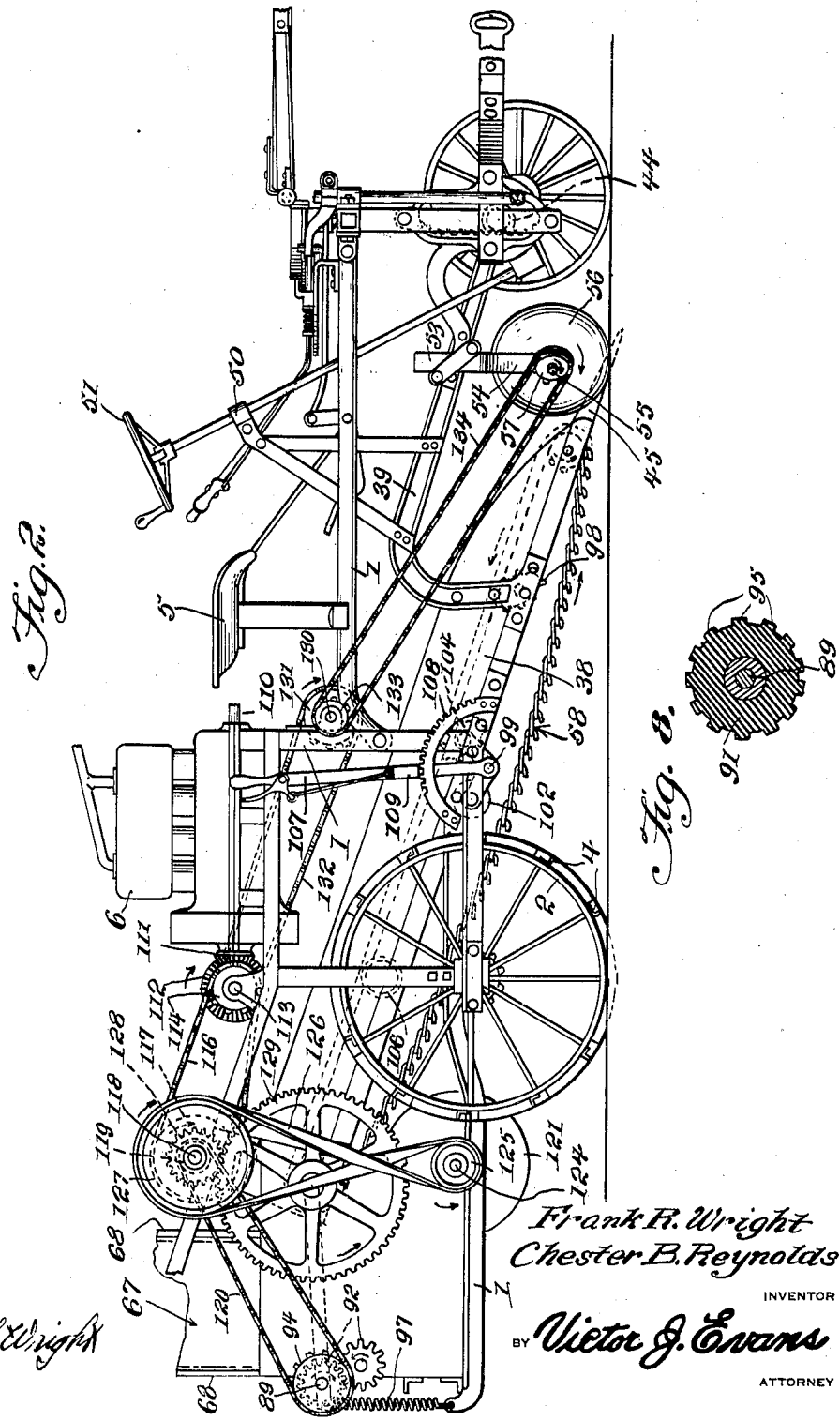

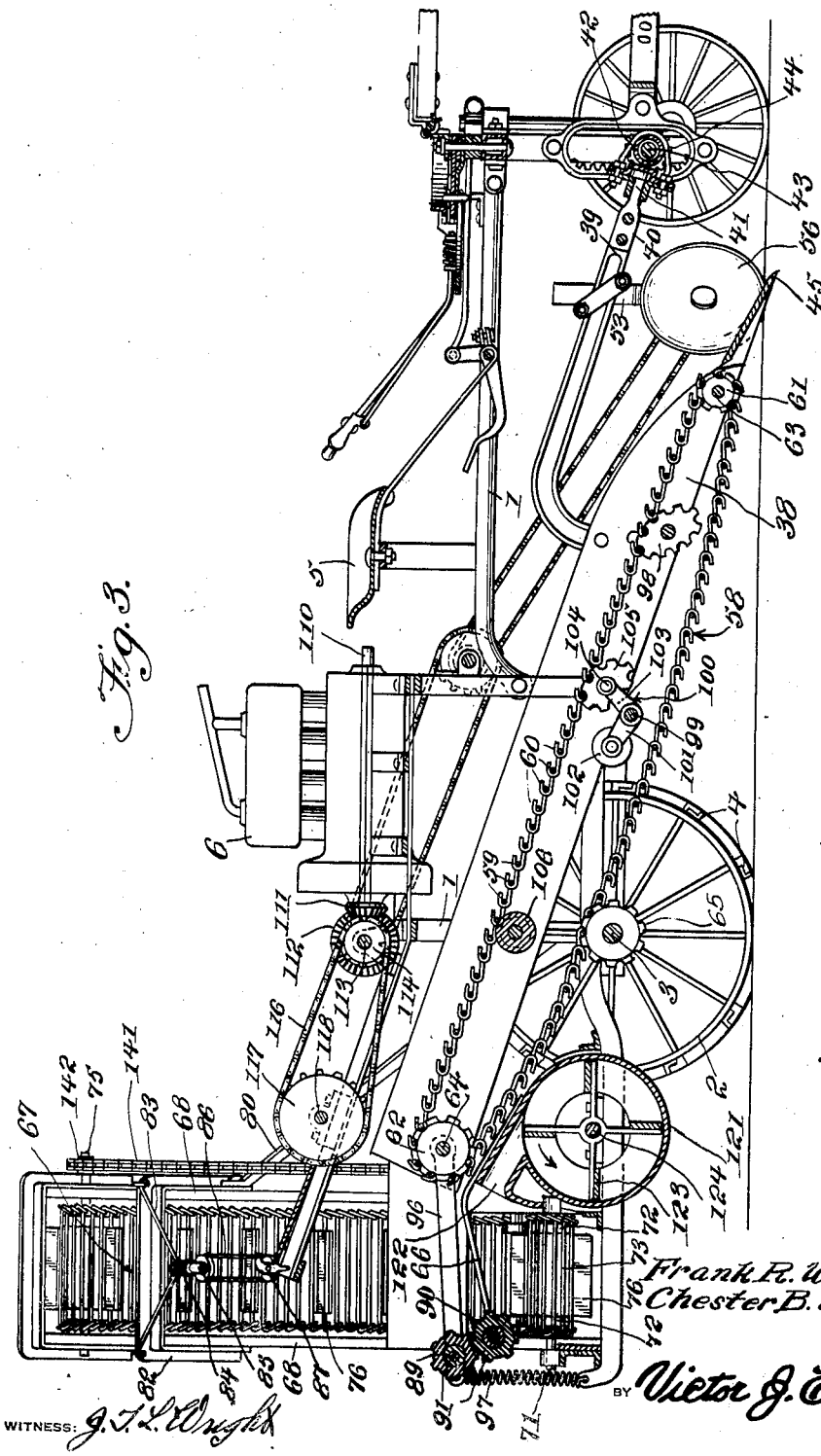

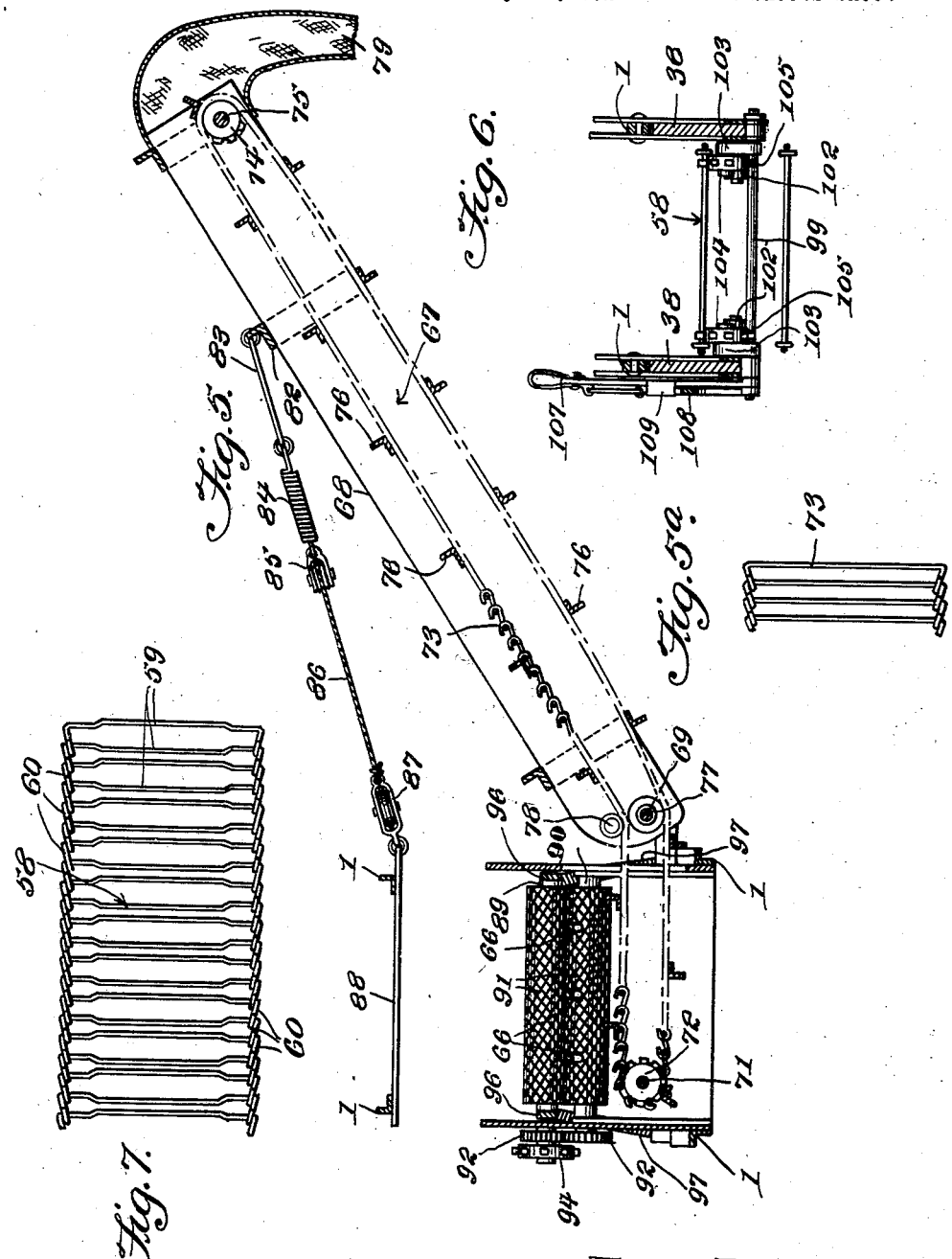

1,715,218

UNITED STATES PATENT OFFICE.

FRANK R. WRIGHT AND CHESTER B. REYNOLDS, OF NEZPERCE, IDAHO.

POTATO DIGGER, CLEANER, AND LOADER.

Application filed July 21, 1924. Serial No. 727,349.

This invention relates to harvesting machines and has for its object the provision of a novel device for digging potatoes, agitating them to shake off dirt, separating them from the vines, and loading them into a wagon or the like traveling beside the machine.

An important object is the provision of a machine of this character embodying a blower apparatus for removing dust and dirt and for producing sufficient blast to assist in discharging the vines and cushioning the fall of the potatoes onto the discharge conveyor whereby bruising will be prevented.

Another object is the provision of a main conveyor which may be permitted to run smoothly and which is equipped with means for imparting a jumping action thereto for shaking the vines and potatoes to remove dirt adhering thereto.

A further object is the provision of a novel power driven mechanism for forcibly plucking and separating the potatoes from the vines without injury to the former and for positively discharging the latter.

With the above and other objects and advantages in view, the invention consists in the combination and arrangement of parts to be hereinafter more fully described and claimed and illustrated in the accompanying drawings in which:

Figure 1 is a plan view of the device.
Figure 2 is a side elevation.
Figure 3 is a longitudinal section.
Figure 4 is a fragmentary elevation of the side opposite that disclosed in Figure 3, the discharge conveyor being in section.
Figure 5 is a section taken longitudinally of the loading or discharge conveyor. Figure 5ª is a fragmentary detail of the conveyor chain.
Figure 6 is a cross section through the loading conveyor.
Figure 7 is a plan view of the main conveyor chain.
Figure 8 is a detail cross-section through one of the vine discharging rollers.

Referring more particularly to the drawings, the device comprises a suitable frame 1 which may consist of any desired number of bars of any suitable cross-section secured together in any desired manner and arranged to support the various elements of the mechanism to be described. This frame carries ground engaging wheels 2 mounted on a suitable axle 3 and preferably equipped with cleats 4 for insuring traction. Mounted on the frame is a seat 5 for the accommodation of the operator, which seat is of course convenient to the various control devices to be described, and also disposed on the frame at a convenient point is an internal combustion engine 6 which furnishes the power for driving the various elements.

Mounted pivotally within the main frame 1 is a vertically swingable frame 38 having secured thereto, at its forward end, a beam structure 39 with a converging forward end 40 rotatably connected at 41 with a bearing structure 42 within which is rotatably mounted a shaft 43 carrying pinions 44 located within the loop-like racks 35 and meshing with the teeth 36 thereof. The purpose of the knuckle or pivot connection 41 is to permit yielding of the entire frame construction when traveling on a hillside or in case a wheel at either side of the machine drops into a rut or depression or passes over a bump.

Mounted at the forward end of the movable frame 38 is a digger blade or shoe 45 adapted to penetrate below the surface of the ground for digging up the potatoes. For regulating the depth of penetration of this digger, we provide interengaging means on the frame and an inclined shaft 49 journaled in a bracket 50 and carrying a hand-wheel 51 located in advance of the seat 5. Obviously, by the interengaging means the entire movable frame 38 may be moved up or down as desired. Secured to the converging sides of the beam 39, are outwardly extending bars 53 having down-turned outer ends 54 through which are journaled shaft 55 carrying disks 56 and sprockets 57. These disks converge rearwardly and are located at opposite sides of the digger shoe 45, for a purpose to be described. The disks are rotated by means to be described.

Mounted within the movable frame 38 is a rearwardly traveling endless conveyor 58 formed of a plurality of substantially U-shaped links 59 having their ends 60 looped and interengaged as shown. This conveyor is trained about sprockets 61 and 62 on shafts 63 and 64, respectively. The lower stretch of the conveyor also engages upon a sprocket 65 carried by the axle 3. Mounted at the rear portion of the frame 1 and below the rear end of the conveyor 58, are longitudinally extending rods 66 which constitute a screen for permitting separation of the potatoes from the vines dug up and carried back along the conveyor. At one side of the rear end of the frame 1 is a loading conveyor designated broadly by the numeral 67, which conveyor includes a suitable frame 68 pivoted on a shaft 69 which is mounted in bearings 70 on the frame 1. Journaled in the frame 1 is a shaft 71 carrying sprockets 72 about which is trained an endless conveyor chain 73 which is also trained about sprockets 74 on a shaft 75 journaled at the outer end of the frame 68. This chain 73 carries transverse cleats 76 and is for the purpose of elevating and discharging the potatoes subsequent to their separation from the vines. On the shaft 69 is a roller 77 located between the upper and lower stretches of the chain 73 and above this roller is a roller 78 which operates to hold the upper stretch down onto the roller 77. With this construction it will be seen that within the confines of the frame 1 this conveyor chain 73 runs horizontally while within the frame 68 it extends in an upwardly inclined direction. At the free end of the conveyor 67 is a discharge spout 79 for directing potatoes into a wagon or the like trailing beside the machine or for discharging them into a sacking mechanism, if preferred. Any suitable braces 80 may be provided for reinforcing this movable or discharge conveyor device 67, and at this same side of the machine from which this conveyor extends is located a platform 81 on which an attendant or operator may stand.

For adjusting the position of the loading conveyor 67, we provide a collar or bracket 82 thereon to which is connected an attaching member 83 to which is connected a spring 84 carried by a pulley block 85 about which is trained a rope or cable 86 trained about a pulley block 87 connected with a bar 88 on the frame 1. The rope or cable 86 is brought forwardly and connected with a suitable means for holding it in a desired position so that the inclination of the loading conveyor may be easily changed at will.

Located at the rear end of the frame 1 and at the ends of the rods 66 are two rollers 89 and 90 which are covered with rubber or other elastic material, indicated at 91, and which are equipped with intermeshing gears 92 whereby they will rotate in opposite directions. The upper roller 89 carries a sprocket 94 and the rubber covered surface thereof is preferably formed with knobs or projections 95 so as to prevent slipping. The purpose of these rollers is to pluck the vines from the potatoes adhering thereto and for forcibly discharging the vines onto the ground. The upper roller is carried by arms 96 pivoted on the shaft 64, and connected with these arms is a spring 97 which pulls the upper roller downwardly toward the lower one.

Journaled in the movable frame 38, at the forward portion thereof, are elliptical sprockets 98 engaging the conveyor chain 58, and journaled transversely of this frame at the intermediate portion thereof is a shaft 99 carrying angle levers 100 including rearwardly extending arms 101 carrying a roller 102, and further including forwardly extending arms 103 carrying a shaft 104 on which are elliptical sprockets 105 adapted to engage the chain 58. Other guide rollers 106 may be provided along the frame 38 for supporting the upper stretch of the chain 58. Secured on one end of the shaft 99 is a lever 107 movable over a notched segment 108 and equipped with a grip-released latch 109 cooperating therewith. By adjusting the lever 107 it is apparent that either the roller 102 or the sprockets 105 may be brought into engagement with the chain 58 for the purpose of permitting the same to run smoothly or to cause it to jump. For driving the above described mechanism, the shaft 110 of the motor 6 is equipped with a bevel gear 111 meshing with a gear 112 on a shaft 113 which carries a sprocket 114 and a sprocket 115. Trained about the sprocket 114 is a chain 116 engaged about a sprocket 117 on a shaft 118, which shaft carries a sprocket 119 about which is trained a chain 120 engaged about the sprocket 94. Obviously, belt and pulleys may be used if preferred, the difference being immaterial.

Mounted on the frame 1 is a blower casing 121 having a discharge 122 inclining upwardly and rearwardly and discharging immediately below the rods 66 for the purpose of assisting the movement of the vines to the co-acting rollers 89 and 90, for pulling the dirt off from the potatoes, and for cushioning the fall of the potatoes through the rods onto the conveyor chain 73. Within the blower casing in a fan 123 mounted on a shaft 124 equipped with a pulley 125 about which is trained a belt 126 which is crossed and engaged about a pulley 127 on the shaft 118.

Carried by the shaft 118 is a gear 128 meshing with a much larger gear 129 on the shaft 64 whereby to drive the main conveyor chain 58. It should be mentioned in passing that the sprockets 65 on the axle 3 are simply for the purpose of supporting and guiding the lower stretch of this main conveyor inasmuch as they are loose on the axle.

Journaled in the frame 1 in advance of the motor and back of the seat is a shaft 130 carrying a sprocket 131 about which is engaged a chain 132 trained about the sprocket 115. The shaft 130 carries two sprockets 133 about which are trained chains 134 which extend forwardly and which are trained about the sprockets 57 for driving the disks 56.

For driving the discharge conveyor chain 73 we provide a sprocket 135 on the shaft 64 and having trained thereabout a chain 136 trained about a sprocket 137 on a shaft which also carries a bevel gear 138 meshing with a bevel gear 139 on the shaft 69. The shaft 69 carries a sprocket 140 about which is trained a chain 141 engaged about a sprocket 142 on the shaft 75. The numeral 143 represents a spring-pressed tightener 136 and others of a similar nature may be provided, if preferred, in connection with any of the other chains.

In the operation, it is quite apparent that when the device is drawn along a field the blade or shoe 45 will dig up the potatoes, vines and all. At the same time the rotating disks 56 will operate to prevent the potatoes from being crowded off to the side by the action of the shoe so that all the potatoes and vines will pass onto the conveyor chain 58 and be conducted thereby and discharged therefrom onto the rods 66. Whether or not the chain 58 be jumped or shaken depends upon the position of the lever 107 controlling the elliptical sprocket 105. Regardless of this detail, it will be noted that the potatoes discharged onto the rods 66 will pass therethrough onto the horizontal stretch of the conveyor chain 73, the vines remaining on top of the rods and being caught between and discharged by the co-acting rollers 89 and 90. Whenever there are any potatoes which adhere to the vines notwithstanding the shaking action of the chain of the conveyor, the dragging of the vines through the rollers will pluck the potatoes from them and as these rollers are rubber covered and as their action is so rapid the potatoes will not be bruised. The blower directing a strong blast of air upwardly and rearwardly through the vines and potatoes will operate to cushion the fall of the latter and will also act to lead the vines to the discharge rollers, the potatoes dropping onto the conveyor 73 are conducted therealong and discharged through the spout 79 into a sacker or wagon trailing along the side of the machine. Ample means has been provided for adjusting the height of the discharge conveyor to accommodate different conditions which may exist.

While we have shown and described the preferred embodiment of our invention, it is of course to be understood that we reserve the right to make such changes in the form, construction and arrangement of parts as will not depart from the spirit of the invention or the scope of the subjoined claim.

We claim:

A tractor operated potato harvester comprising a means for plowing up the plants, rotary discs adjacent thereto set at an angle to divert the material dug centrally, a longitudinally travelling screen to transfer the material, intermittent agitators, a transverse travelling screen, a blower to divert the vines across the screen, a pair of rolls to grip and discharge the vines, and a chute to deliver the potatoes from the screen.

In testimony whereof we affix our signatures.

FRANK R. WRIGHT.
CHESTER B. REYNOLDS.